(No Model.) 2 Sheets—Sheet 1.

P. PEARSON.
APPARATUS FOR ROASTING COFFEE AND OTHER VEGETABLE SUBSTANCES.

No. 250,571. Patented Dec. 6, 1881.

Witnesses.
James F. Tobin.
Harry Smith

Inventor.
Peter Pearson
by his Attorneys
Howson and Son (No Model.) 2 Sheets—Sheet 2.

P. PEARSON.
APPARATUS FOR ROASTING COFFEE AND OTHER VEGETABLE SUBSTANCES.

No. 250,571. Patented Dec. 6, 1881.

Witnesses.
James F. Tobin
Harry Smith

Inventor.
Peter Pearson
by his Attorneys
Howson and Sons

UNITED STATES PATENT OFFICE.

PETER PEARSON, OF MANCHESTER, COUNTY OF LANCASTER, ENGLAND.

APPARATUS FOR ROASTING COFFEE AND OTHER VEGETABLE SUBSTANCES.

SPECIFICATION forming part of Letters Patent No. 250,571, dated December 6, 1881.

Application filed September 5, 1881. (No model.) Patented in England February 25, 1881.

*To all whom it may concern:*

Be it known that I, PETER PEARSON, a subject of the Queen of Great Britain, and residing at Manchester, county of Lancaster, England, have invented Improvements in Apparatus for Roasting Coffee, &c., (for which I have obtained a patent in Great Britain, No. 810, dated February 25, 1881,) of which the following is a specification.

The object of this invention is to construct a simple and effective apparatus for roasting coffee or other vegetable substances, so that the coffee may be fed in the raw state into one end of the apparatus and be discharged roasted at the other, the aroma being also preserved and the weight only very slightly diminished. This object I attain by constructing the apparatus as hereinafter described.

Figure 1:
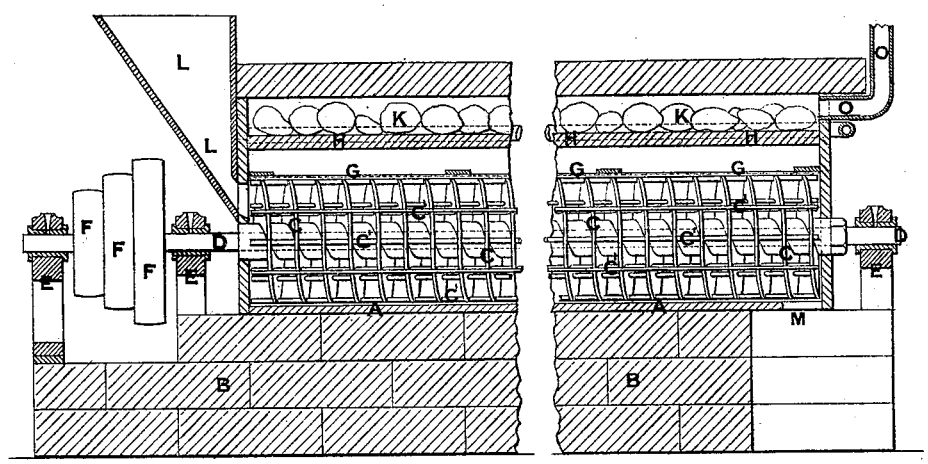
Figure 2:
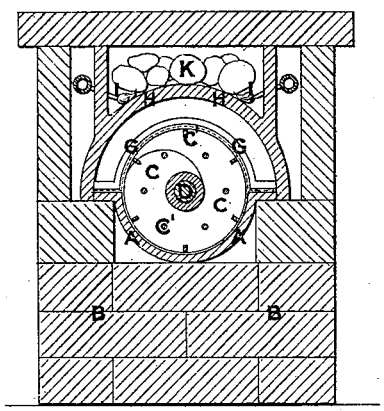
Figure 3:
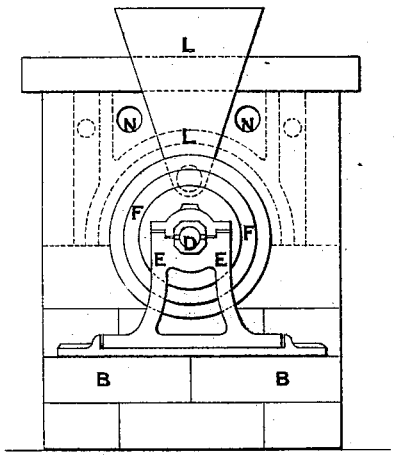

In the accompanying drawings, Figure 1 is a longitudinal section, Fig. 2 a transverse section, and Fig. 3 an end view, of one form of my improved apparatus.

A A is the trough, supported on brick-work B B, and having fitted in the interior a screw or worm, C C, on the shaft D D, which is mounted in suitable bearings, E E, and is caused to revolve slowly by means of a band passing around one of the pulleys F F, or by any other suitable means.

G G is a semi-cylindrical cover of wire-gauze, inclosing the upper half of the worm, so as to prevent the coffee or other substance to be roasted from coming into actual contact with the red-hot plate H H, which is kept heated by the gas-jets I I.

K K represent lumps of fire-clay or other refractory substance laid on the curved plate H, to assist in keeping it hot.

L L is the hopper for supplying the coffee or other substance, and M M the outlet for discharging the same when roasted. Openings N are formed at one end for the admission of air to support combustion, while the products of combustion escape through the pipe O at the other end.

Figure 4:
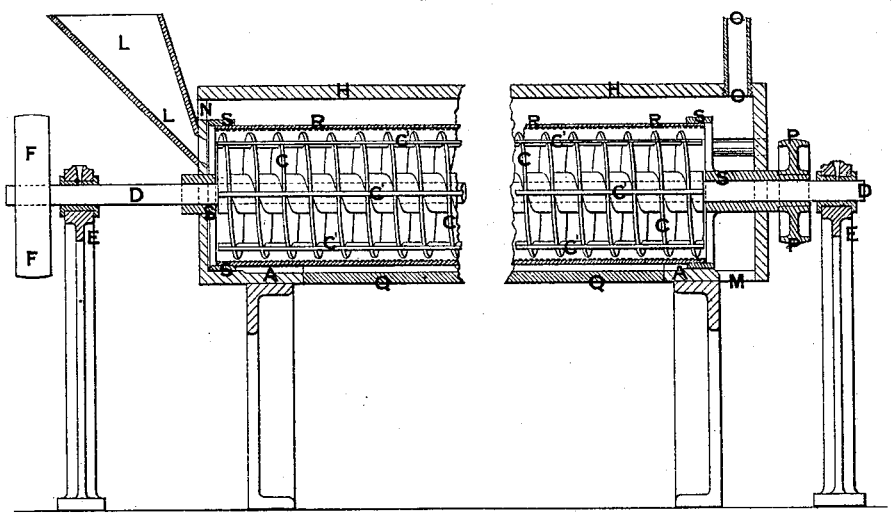
Figure 5:
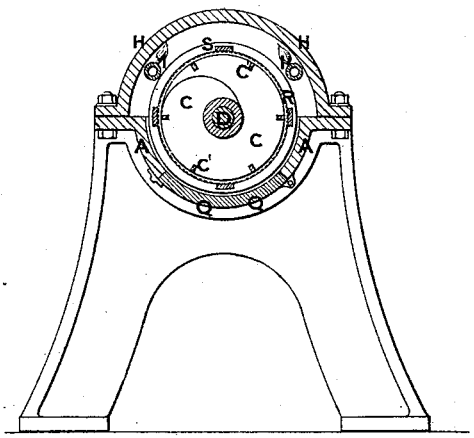
Figure 6:
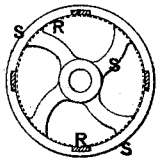

Fig. 4 is a longitudinal section, and Fig. 5 a transverse section, of a slightly modified form of the apparatus. In this case the screw C C is surrounded by a cage, R R, of wire-gauze, (see detached section, Fig. 6,) each end of which is attached to a rim-wheel, S S, running loosely upon the axle or shaft D, one of the wheels S being cast with a long boss or sleeve, on the outer end of which is keyed a driving-pulley, P. The gas-jets I I are in this case placed inside the top curved plate, H, and the lumps of refractory material dispensed with. The screw C and the cage R are both driven in the same direction, but the latter is driven much faster than the former, the rapid revolution of the cage R turning the coffee over constantly, while the slow revolution of the screw C moves it gradually along toward the discharge-opening M. In this arrangement the longitudinal wires C' may be entirely dispensed with, or only partially so, as shown in the drawings.

In order to prevent the accumulation of dust or other matter which may fall through the gauze cage R into the trough A, I make a long opening therein, which I close by a hinged or sliding door, Q, which may be opened in order to clean out the trough; or the door may be dispensed with, and any dust or other matter falling from the cage R will fall through the opening.

I claim as my invention—

1. The combination of the trough and a rotating feed-screw with a curved metal top, and means, substantially as described, for heating said metal top.

2. The combination of the trough and a rotating feed-screw with a cover or cage of wire-gauze, a curved metal top, and means, substantially as described, for heating said metal top.

In testimony whereof I have signed my name to this specification in the presence of two subscribing witnesses.

PETER PEARSON.

Witnesses:
CHARLES DAVIES,
JNO. HUGHES.